United States Patent [19]
Horwitz

[11] Patent Number: 5,764,701
[45] Date of Patent: Jun. 9, 1998

[54] VSB MODULATOR

[75] Inventor: Thomas P. Horwitz, Elgin, Ill.

[73] Assignee: Zenith Electronics Corporation, Glenview, Ill.

[21] Appl. No.: 610,171

[22] Filed: Mar. 4, 1996

[51] Int. Cl.⁶ .............................. H04L 27/04; H03C 1/52
[52] U.S. Cl. .............................. 375/301; 332/170
[58] Field of Search .............................. 375/277, 301, 375/229, 230, 295; 455/46, 47, 109; 332/170; 364/723, 724.19, 724.2; 348/723, 724

[56] References Cited

U.S. PATENT DOCUMENTS

| | | | |
|---|---|---|---|
| 4,003,002 | 1/1977 | Snijders et al. | 332/170 |
| 4,617,537 | 10/1986 | Nossek | 332/151 |
| 4,802,191 | 1/1989 | McGeehan et al. | 375/301 |
| 5,313,279 | 5/1994 | Wang et al. | 348/426 |
| 5,327,462 | 7/1994 | Takahashi et al. | 375/301 |
| 5,469,475 | 11/1995 | Voorman | 375/252 |

*Primary Examiner*—Tesfaldet Bogure

[57] ABSTRACT

A VSB modulator receives a stream of data at a 10.76 MHz constant symbol rate and converts it to a 6 MHz bandwidth signal centered at 44.0 MHz. The incoming data is interpolated by three to generate three data images and a digital filter selects the image embracing the range of 5.38 to 10.76 MHz. A sine X/X correction is added to compensate for the loss experienced in the D/A converter. The signal for the D/A converter is filtered and mixed with a 35.93 MHz oscillator output to produce data about the 44.0 MHz IF frequency. A SAW filter rejects all but the desired data.

20 Claims, 2 Drawing Sheets

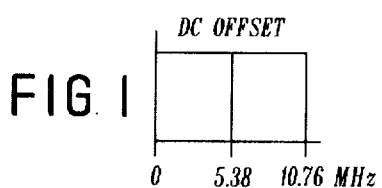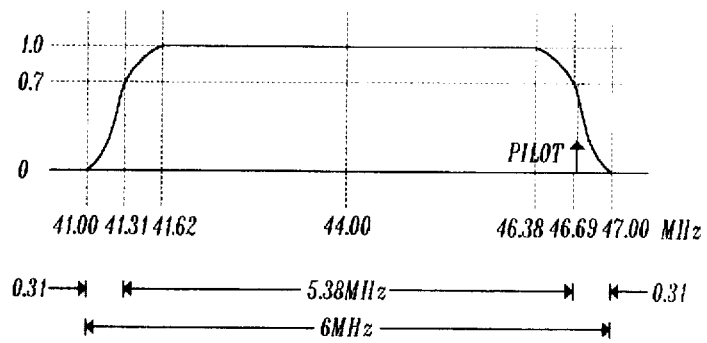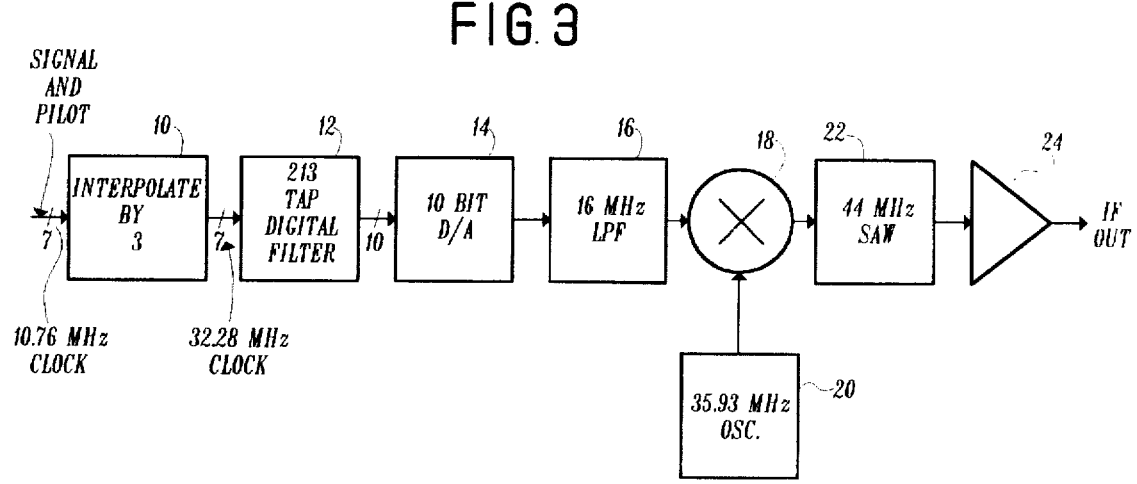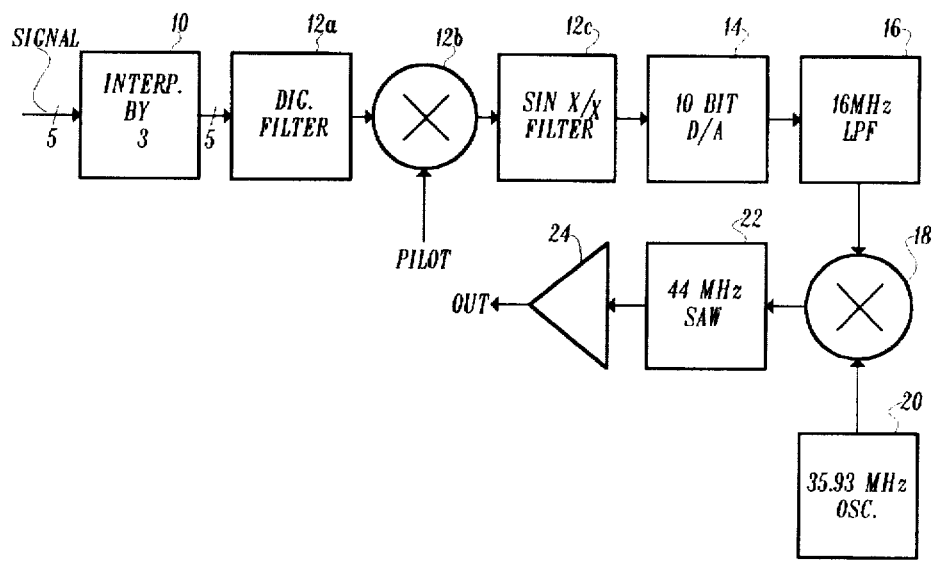

VSB MODULATOR

BACKGROUND OF THE INVENTION and PRIOR ART

The HDTV (high definition television) system currently under evaluation by the FCC incorporates a VSB (vestigial sideband) transmission system. The data is in the form of multi level symbols occurring at a constant 10.76 MHz symbol rate in a spectrum that is flat across the entire frequency band. The invention provides a method and apparatus for shifting the 10.76 MHz symbol data up in frequency to occupy a 6 MHz wide channel centered about a 44.0 MHz IF frequency.

OBJECTS OF THE INVENTION

A principal object of the invention is to provide a novel VSB modulator.

Another object of the invention is to provide a low cost VSB modulator for transforming baseband symbol data into digital data at an analog output IF frequency.

BRIEF DESCRIPTION OF THE DRAWINGS

These and other objects and advantages of the invention will be apparent upon reading the following description in conjunction with the drawings, in which:

FIG. 1 illustrates the input data frequency spectrum of the baseband signal;

FIG. 2 illustrates the VSB modulator output signal spectrum;

FIG. 3 is a generalized block diagram of the preferred implementation of the invention;

FIG. 10 is a block diagram of an alternative implementation of the invention.

DESCRIPTION OF THE PREFERRED EMBODIMENT

Figure 4:
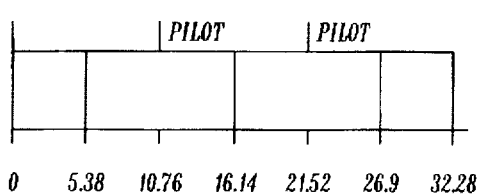
FIG. 4 illustrates the spectrum at the output of the interpolator 10.

The spectrum of the input baseband symbol data is illustrated in FIG. 1. The data has a 10.76 MHz data rate and its spectrum is flat across the entire frequency band. The input data has a small DC offset which represents a pilot.

In FIG. 2, the modulator output spectrum is illustrated. It occupies the same frequency spectrum as a conventional NTSC IF signal with the center frequency being 44.0 MHz and the IF channel being 6 MHz wide. The spectrum is flat except at its edges where the root-raised cosine response results in 0.62 MHz transition regions. The small pilot resulting from the DC offset in the input data is present at 0.31 MHz below the upper band edge. The frequency of the pilot is 46.69 MHz.

In the preferred implementation illustrated in FIG. 3, the 7 bit input data, including the pilot, is applied to an interpolator 10 which interpolates by three. Interpolation is in fact multiplication and results in tripling of the 10.76 MHz data rate (clock rate) to 32.28 MHz. In the interpolation, zero value symbols are inserted between each data symbol. (When interpolating by three, two zero symbols are inserted between each data symbol, which results in tripling the data rate.) The interpolation also expands the frequency spectrum of the baseband symbols and makes available three duplicate images of the baseband data. The output of the interpolator is a 7 bit number which is applied to a digital filter 12, indicated as being a 213 tap filter. Its output is a 10 bit number that is applied to a D/A (digital-to-analog) converter 14 which in turn is coupled to a 16 MHz low pass filter 16. The output of filter 16 is applied to a mixer 18 which is also supplied with the output of an oscillator 20 that operates at 35.93 MHz. The mixer output is coupled to a 44.0 MHz SAW (surface acoustic wave) filter 22, the output of which is applied to an amplifier 24 which supplies the 44.0 MHz IF output from the modulator.

Figure 5:
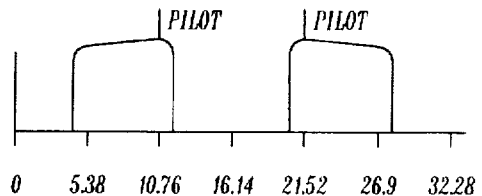
FIG. 5 illustrates the spectrum at the input of the D/A converter 14.

FIG. 4 illustrates the spectrum as generated by interpolator 10 from the input 10.76 MHz data or clock signal. Pilot signals are shown at 10.76 and 21.52 MHz (there is also one at 32.28 MHz). To produce a 6 MHz wide channel, the frequency range of the data must be in excess of 6 MHz and therefore the data is tripled. The spectrum embracing the range of 5.38 to 10.76 MHz may be selected and passed through suitable filters to produce a 6 MHz bandwidth signal. Digital filter 12 selects the desired data range as is illustrated in FIG. 5, which represents the spectrum at the input of D/A converter 14. The slopes of the data spectrum illustrated in FIG. 5 are the result of a sine X/X correction that is added in the digital filter 12 to the signal to compensate for the known characteristic of the D/A converter 14 and roll off the higher frequency signals.

Figure 6:
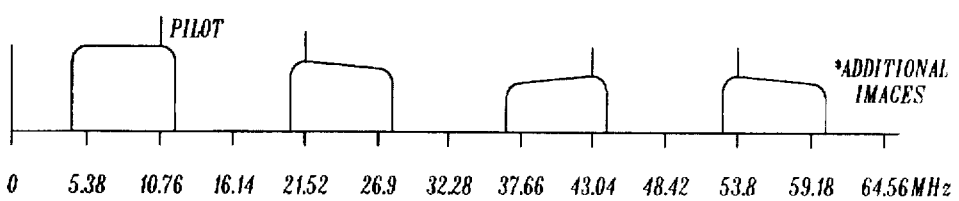
FIG. 6 illustrates the spectrum at the output of the D/A converter 14.
Figure 7:
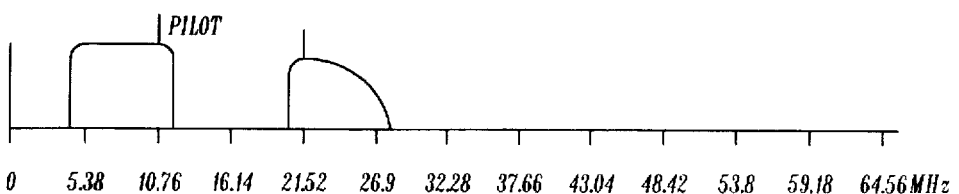
FIG. 7 illustrates the output at the low pass filter 16.

In FIG. 6, the spectrum at the output of D/A converter 14 is shown. The initial data images (embracing 5.38 and 10.76 MHz) has a flat response as a result of the roll off of the D/A converter and the sine X/X compensation. The other data images however are lower in amplitude and experience less than full compensation because of the frequency roll off characteristics of the D/A converter. The spectrum of FIG. 6 is subjected to the 16 MHz low pass filter action and generates the spectrum illustrated in FIG. 7 where the data between 21.52 and 26.9 MHz is further rolled off and the remaining additional images are eliminated.

Figure 8:
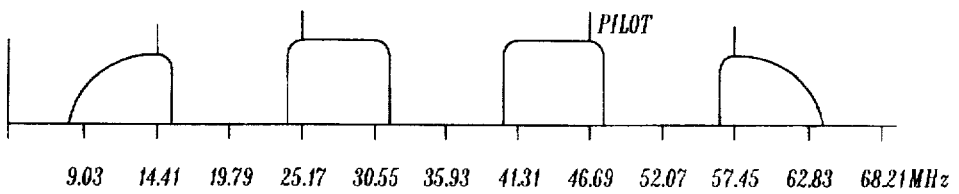
FIG. 8 illustrates the spectrum at the output of the mixer 18.
Figure 9:
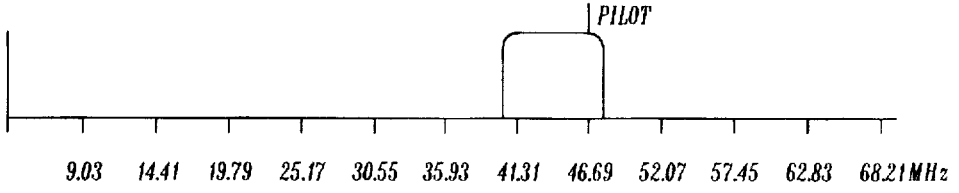
FIG. 9 illustrates the spectrum at the output of the SAW filter 22.

Application of the oscillator frequency of 35.93 MHz to the output of mixer 16 in mixer 18 generates a symmetrical waveform about the 35.93 MHz oscillator frequency as shown in FIG. 8. This spectrum is subjected to the very sharp filtering of the 44 MHz SAW filter 22 to select the data image centered about 44.0 MHz, which is 6 MHz wide and represents the desired output of the VSB modulator.

An alternative embodiment of the invention is illustrated in FIG. 10 which achieves a cost benefit by omitting the pilot from the input signal and applying it after the digital filter. This embodiment will be beneficial in an integrated circuit implementation of the invention. The major difference is the location of pilot insertion. In the alternative arrangement, the pilot is not in the input but is added after the digital filter. The 7 bit input signal becomes a 5 bit signal and the digital filter is much simpler. The 5 bit input signal is applied to a simpler digital filter 12a, the output of which is combined with the pilot in an adder 12b. The 10–12 bit output of adder 12b is supplied to a sin X/X correction filter 12c. Thereafter, the signal is supplied to a 10–12 bit D/A converter 14 as described above in connection with FIG. 3. The waveforms are the same except that the spectra of FIG. 1 and FIG. 4 do not include a DC offset (pilot signal). Specifically, FIG. 1, without the DC offset, applies as the input to the FIG. 10 circuit. The FIG. 4 spectrum, without the pilots, represents the output of interpolator 10 (FIG. 10) and FIG. 5 represents the spectrum at the output of sin X/X filter 12c. This alternate embodiment is clearly the arrangement of choice for a custom integrated circuit, while the FIG. 3 preferred implementation is more desirable if off-the-shelf parts are used.

The invention incorporates a combination of digital and analog techniques for economically accomplishing VSB modulation. By digitally shaping the signal at baseband frequencies, the spectrum is undistorted and the errors normally associated with analog processing are avoided. On the other hand, shifting up the frequency of the signal is done on an analog basis, which is much more economical than shifting up the frequency on a digital basis.

What has been described is a novel VSB modulator for converting 10.76 MHz rate data symbols into a 6 MHz bandwidth analog signal centered about a 44.0 MHz IF frequency. It is recognized that numerous changes in the described embodiment of the invention will be apparent to those skilled in the art without departing from its true spirit and scope. The invention is to be limited only as defined in the claims.

What is claimed is:

1. A method of generating a VSB signal at an IF frequency from baseband symbol data of constant symbol rate and fixed bandwidth comprising:

multiplying the data rate of the baseband symbol data to create multiple data images in an expanded frequency spectrum;

digital filtering the expanded frequency spectrum to select a desired one of the multiple data images;

converting the desired data image to an analog signal; and shifting the analog signal to the IF frequency.

2. The method of claim 1 further comprising digitally filtering the multiple data images to reject all but the desired one of the multiple data images; and filtering the analog signal.

3. The method of claim 2 wherein the digital filtering also includes applying a sine X/X correction.

4. The method of claim 1 wherein the multiplying step comprises interpolating the baseband symbol data.

5. The method of claim 4 further including inserting zero data levels for the interpolated points in the interpolated baseband symbol data.

6. The method of claim 5 further comprising digitally filtering the multiple data images to reject all but the desired one of the multiple data images; and filtering the analog signal.

7. The method of claim 6 wherein the digital filtering also includes applying a sine X/X correction.

8. The method of generating a 6 MHz bandwidth VSB signal at an IF frequency of 44.0 MHz from baseband symbol data having a 10.76 MHz symbol rate comprising:

multiplying the 10.76 MHz symbol rate of the baseband symbol data to create three data images in a 32.28 MHz frequency spectrum;

digital filtering the 32.28 MHz frequency spectrum to select a desired one of the multiple data images centered about 8.07 MHz;

converting the desired data image to an analog signal; and shifting the analog signal to 44.0 MHz IF frequency.

9. The method of claim 8 wherein the multiplying step comprises interpolating the baseband symbol data by three to multiply the data rate to 32.28 MHz and adding zero data levels at the interpolated points.

10. The method of claim 9 wherein digital filtering comprises utilizing a digital filter with 213 taps and adding a sine X/X correction to the filtered signal.

11. A VSB modulator comprising:

means for supplying baseband symbol data of constant symbol rate and fixed bandwidth to said modulator;

means for multiplying the data rate of said baseband symbol data to create multiple data images over an expanded frequency spectrum;

means for digital filtering the expanded frequency spectrum for selecting a desired one of said multiple data images;

means for converting the desired data image to an analog signal; and means for shifting the analog signal to an IF frequency.

12. The modulator of claim 11 further comprising means for filtering said expanded frequency spectrum to select said desired one of said multiple data images;

means for low pass filtering said analog signal prior to shifting said analog signal to said IF frequency; and means for filtering the shifted analog signal.

13. The modulator of claim 12 further including means for adding a sine X/X correction to said digitally filtered data images.

14. The modulator of claim 11 wherein said multiplying means comprises interpolating means.

15. The modulator of claim 14 further including means for adding zero data levels to the interpolated points generated by said interpolating means.

16. The modulator of claim 15 further comprising means for filtering said expanded frequency spectrum to select said desired one of said multiple data images;

means for low pass filtering said analog signal prior to shifting said analog signal to said IF frequency; and means for filtering the shifted analog signal.

17. The modulator of claim 16 further including means for adding a sine X/X correction to said desired one of said multiple data images.

18. A VSB modulator comprising:

means for receiving baseband symbol data of 10.76 MHz symbol rate;

means for multiplying said 10.76 MHz symbol rate of said baseband symbol data to 32.28 MHz to create three data images in an expanded frequency spectrum;

means for selecting a data image embracing the range of 5.38 to 10.76 MHz;

means for converting said selected data image to an analog signal; and means for shifting said analog signal to a 44.0 MHz frequency.

19. The modulator of claim 18 wherein said multiplying means comprises means for interpolating said symbol data rate by three and means for adding zero data values to the interpolated points.

20. The modulator of claim 19 wherein said digital filter means comprises a digital filter and further including means for adding a sine X/X correction to the filtered signal.

* * * * *